UNITED STATES PATENT OFFICE 2,504,147

TREATING PROCESS FOR CADMIUM PIGMENTS

James J. O'Brien, Baltimore, Md., assignor to The Glidden Company, Cleveland, Ohio, a corporation of Ohio No Drawing. Application October 30, 1946, Serial No. 706,814

9 Claims. (Cl. 106—301)

This invention relates to improvements in methods for calcining cadmium red pigments.

In the production of cadmium pigments which consist of or comprise cadmium sulfides or cadmium-sulfo-selenides, a calcination step is employed for the purpose of causing chemical and/or physico-chemical alterations in the structure of the cadmium sulfides or cadmium-sulfo-selenides which in turn produce variations in the color or shade of the pigment. The calcination is generally performed at temperatures between about 350° C. and 700° C., and a preselected atmosphere is usually provided as a means for improving the reproducibility of color or shade from batch to batch. The improvement in reproducibility arises in part from the effect of the atmosphere in reducing losses of selenium by oxidation, and in further part from its effect in decreasing or preventing the formation of cadmium oxide. Cadmium oxide is harmful in the finished pigment because it produces "muddy" colors and "off-color" shades. The loss of selenium is undesirable because selenium is an expensive ingredient, and because the loss, if variable and unpredictable from batch to batch, may result in harmful variations in the ratio of sulfur to selenium in the finished pigment, thereby producing "off-color" pigment.

Many different furnace atmospheres have been proposed by workers in this field, to provide widely divergent characteristics in respect to their reducing properties. These differences in characteristics have come about partly because specific desirable effects have been found to be caused by specific materials, but largely because the reactions which occur during the calcining operation are both complex and obscure and do not yield readily to rational analysis. Accordingly the atmospheres are selected on the basis of their practical effectiveness for obtaining the desired result.

In the course of my experiments, I have found that by employing the combinations of agents hereinafter described, under the conditions described, cleaner, brighter red pigments substantially free of cadmium oxide can be produced, and with improved ease of reproducibility.

Accordingly, it is an object of this invention to provide an improved process for calcining cadmium red pigments.

It is another object to provide an improved calcination process whereby selenium losses may be decreased, and the formation of cadmium oxide may be reduced or prevented.

A further object is to provide a calcining process which employs new combinations of treating agents.

Another object is to provide an improved calcining process which produces cleaner and brighter cadmium red colors.

A still further object is to provide an improved calcining process by means of which the desired quality of cadmium red pigments is obtained and reproduced easily.

These and other objects will appear from the following description of the invention.

In my United States Patent No. 2,220,116, I have disclosed the use of volatile nitrates such as ammonium nitrate, hydroxylamine nitrate and other aminenitrates, as agents which may be introduced into the calcining zone of a furnace during the calcination of cadmium colors, to produce beneficial partially oxidizing effects. I have now found that when such volatile nitrates are employed in combination with sulphur-containing compounds selected from the group consisting of hydrazine sulfate, and the alkali metal sulfites, acid sulfites, hyposulfites, sulfates, and thiosulfates unexpected improvements in cadmium red colors can be secured; i. e. the colors are cleaner and brighter, contain less cadmium oxide or may be free of cadmium oxide, and exhibit those properties and characteristics which arise from reduced losses of selenium. I have also found that by using the sulfur containing compounds alone, without the concomitant presence of a volatile nitrate, that brighter and cleaner red colors may also be obtained.

In practicing the invention, the sulfur-containing compounds alone or their admixtures with a volatile nitrate as described above may be introduced into the calcining zone separately from the charge, but by preference the agents are introduced by incorporating them in the cadmium red "greencake" before the latter is subjected to the calcining operation. Calcining temperatures of between about 350° C. and 700° C. are suitable, but for most plant practice temperatures between about 500° C. and 700° C. are preferred. The temperatures or temperature range which is used, as well as the duration of heating at the selected temperature, are best determined by trial since the optimum temperature and optimum time vary somewhat with the composition of the pigment which is being calcined, and with the type of furnace and container which is employed. The amounts of volatile nitrates and sulfur-containing compounds which are used also depend upon the same factors to some extent, but for most purposes the volatile nitrates may range from about ½% to about 15% by weight of the "greencake" with amounts between about 1% and 10% being preferred. The amounts of sulfur-containing compounds may range from about ½% to about 10% with amounts between about 1% and 5% being preferred. By adjusting the amount of the sulfur-containing agents within these limits and in proportion to the needs as determined by the type of equipment used and the composition of the red pigment, oxidation of the cadmium compounds to cadmium oxide can be reduced and in many instances substantially prevented.

In order to retain maximum benefit from the invention, the calcined charge should be quenched in water directly upon completion of the desired period of time at the selected calcining temperature, and the quenched charge should then be thoroughly washed and finally dried without resubjecting it to temperatures appreciably in excess of about 300° F. The pigments thereby retain the clean, bright colors which are produced by the calcinating agents.

The tinting strength of red pigments made in accordance with the invention may be as high as that of control colors made in accordance with the teachings of my United States Patent No. 2,220,116, although in some instances slightly lower calcining temperatures may be required in order to attain quality of tinting strength.

The following examples will serve to illustrate the principles of the invention, which may be applied to cadmium red pigments generally, including the pure cadmium sulfo-selenide pigments, cadmium lithopones, and various composite cadmium sulfo-selenide pigments.

The pigment which was used in the following group of examples was taken from a plant batch produced by reacting 266 gallons of cadmium sulfate solution having a density of 35.1° Baumé at 20° C. with 615 gallons of barium sulphide solution having 265 pounds of selenium dissolved in it and having a density of 15.5° Bé. at 55° C. These proportions yield a pigment having a deep shade of red. After the solutions had been reacted, the precipitate was filtered, washed, and ground to produce a cadmium red "greencake."

CONTROL

A 25 gram sample of the cadmium red "greencake" was thoroughly mixed with 6% (1.5 grams) of ammonium nitrate and calcined in a Pyrex ignition tube open at one end at temperatures ranging from about 368° C. at the beginning of the calcination to about 641° C. at the time the batch was quenched, and then was washed, and dried at about 150° C. The sample was in the furnace for approximately ¾ hr.

Color: Maroon, somewhat brown.
Tinting Strength: 100%.

*Example I*

A 25 gram sample of the cadmium red "greencake" was thoroughly mixed with 6% (1.5 grams) of ammonium nitrate and with 5% (1.25 grams) of sodium acid sulfite, and was then calcined, quenched, washed and dried as in the preceding "Control" example.

Color: Bright red slightly lighter than maroon
Tinting Strength: 90%.

*Example II*

A 25 gram sample was prepared and treated as in Example I, but the final calcining temperature just prior to quenching was 624° C.

Color: Cleaner and brighter than Example I.
Tinting Strength: 100%.

*Example III*

A 25 gram sample of the cadmium red "greencake" was thoroughly mixed with 6% (1.5 grams) of ammonium nitrate and with 3% (.75 gram) of sodium acid sulfite, and was calcined as in the "Control" example, then quenched, washed, and dried.

Color: Good bright maroon.

*Example IV*

A 25 gram sample of the cadmium red "greencake" was thoroughly mixed with 6% ammonium nitrate and with 5% of sodium sulfite ($Na_2SO_3$), and was then calcined, quenched, washed, and dried as in the "Control" example.

Color: Slightly lighter and brighter than "Control."

If hydrazine sulfate is substituted for sodium sulfite in this example, the pigment is made even lighter in color.

*Example V*

A 25 gram sample of the cadmium red "greencake" was thoroughly mixed with 6% of ammonium nitrate and with 5% of sodium hyposulfite ($Na_2S_2O_4 \cdot 2H_2O$), and was then calcined, quenched, washed, and dried as in the "Control" example.

Color: Good bright red.

*Example VI*

A 25 gram sample of the cadmium red "greencake" was thoroughly mixed with 6% of ammonium nitrate and with 4% of sodium thiosulfate ($Na_2S_2O_3 \cdot 5H_2O$), and was then calcined, quenched, washed and dried as in the "Control" example.

Color: Clear and bright, slightly lighter than the "Control" example.

In the following examples, the effects of applying the invention to pure cadmium red pigments are indicated. In these examples the pure red pigment was prepared by reacting 500 ml. of cadmium nitrate solution having a density of 35° Bé. at 20° C. with 1200 ml. of barium sulfide solution containing 60 g. selenium dissolved in it and having a density of 15.5° Bé. The sulfo-selenide solution was slowly added to the cadmium nitrate solution and the mixture was agitated for a period of about 2½ hours. The final pH of the reaction mass was about 7.6. The precipitated pigment was filtered out of the reaction mass and was then washed until practically free of barium nitrate by reslurrying it four times in succession in 4 liters of water and filtering after each reslurrying. The washed precipitate was then dried.

*Example VII*

A 25 gram control sample of the pure red pigment was thoroughly mixed with 1.5 grams of ammonium nitrate, and was then calcined at temperatures ranging from 546° C. at the beginning of calcination to about 657° C. at the time the sample was quenched. The quenched sample was washed and dried, and yielded a red pigment having a color intermediate between a medium and a deep shade.

*Example VIII*

Another 25 gram sample of the same pure red pigment was mixed with 1.5 grams of ammonium nitrate and with 1 gram of sodium acid sulfite (NaHSO₃), and then calcined, quenched, washed and dried in the same manner as in Example VII. The resulting pigment had a clear bright red color of lighter shade than that obtained in Example VII.

In Examples IX and X which follow, the invention is applied to a Medium Light Red Lithopone "greencake" obtained by reacting 400 gallons of cadmium sulfate solution, having a density of 35.2° Bé. at 20° C., with 860 gallons of barium sulfide solution having a density of 15.5° Bé. at 50° C., the barium sulfide solution having dissolved therein 225 pounds of selenium. The solutions were mixed together, heated to 50° C. and agitated for one hour. The reaction mass then had a pH of 8.7. The pigment was filtered out, washed, and dried at about 300° F.

*Example IX*

A 25 gram sample of the Medium Light Lithopone "greencake' was mixed with 1 g. of sodium acid sulfite (NaHSO₃) and with 1.5 g. of ammonium nitrate, after which it was calcined in an open-end Pyrex tube for about 35 minutes at temperatures ranging from 368° C. at the beginning of calcination to about 641° C. at the end. The sample was quenched in water promptly after completion of the calcination, then washed and dried.

Color: Deep shade of red; clear and bright.

*Example X*

A 25 gram sample of the Medium Light Red "greencake" was mixed with 1 g. of sodium acid sulfite (NaHSO₃) without including any volatile nitrate such as the ammonium nitrate of Example IX, and was then calcined, quenched, washed, and dried as in Example IX. The resulting pigment was medium light red in color, but much clearer and brighter than the Medium Light standard.

Various examples have been given showing the use of particular materials and proportions, but it should be recognized that the other materials hereinbefore described may be used similarly, and that other proportions within the ranges hereinbefore indicated may be applied.

Having described the invention, what I claim is:

1. The process of producing cadmium red pigments of improved clarity and brightness of color which comprises the steps of: preparing a crude cadmium red greencake; washing said greencake until substantially free of water-soluble compounds; adding and mixing into said washed greencake only from about ½% to 10% of a water soluble salt of a strong base and an oxygenated sulfur acid selected from the group consisting of hydrazine sulfate and the alkali metal sulfites, acid sulfites, hyposulfites, sulfates and thiosulfates; and calcining the resulting mixture at temperatures between about 350° C. and 700° C.

2. The process as claimed in claim 1 wherein from about 1% to 5% of said water-soluble salt is employed and wherein the calcining temperatures range from about 500° C. to about 700° C.

3. The process of producing cadmium red pigments of improved clarity and brightness of color which comprises the steps of: preparing a crude cadmium red greencake; washing said greencake until substantially free of water-soluble compounds; adding and mixing into said washed greencake only (a) from about ½% to 10% of a water-soluble salt of a strong base and an oxygenated sulfur acid selected from the group consisting of hydrazine sulfate and the alkali metal sulfites, acid sulfites, hyposulfites, sulfates and thiosulfates, and (b) from about ½% to 15% of a volatile nitrate; and calcining the resulting mixture at temperatures between about 350° C. and 700° C.

4. The process as claimed in claim 3 wherein about 1% to 5% of said water-soluble salt is employed; wherein about 3% to 10% of a volatile nitrate is employed; and wherein the calcining temperatures range from about 500° C. to 700° C.

5. A process for producing improved cadmium red pigments which comprises a calcining step consisting of heating crude cadmium red pigment which has been washed until substantially free of water-soluble compounds, at temperatures between about 350° C. and 700° C. until said crude material has been converted to pigment, there only being added to said crude material so as to have present at the commencement of the said heating thereof (a) between about ½% and 10% of a water-soluble salt of a strong base and an oxygenated sulfur acid selected from the group consisting of hydrazine sulfate and the alkali metal sulfites, acid sulfites, hyposulfites, sulfates and thiosulfates; and (b) between about .5% and 15% of a volatile nitrate.

6. The process as claimed in claim 5 wherein the volatile nitrate is ammonium nitrate.

7. The process as claimed in claim 5 wherein the water-soluble salt is an alkali metal acid sulfite, and wherein the volatile nitrate is ammonium nitrate.

8. A process for producing improved cadmium red pigments which comprises a calcining step consisting of heating crude cadmium red pigment which has been washed until substantially free of water-soluble compounds, at temperatures between about 350° C. and 700° C. until said crude material has been converted to pigment, there only being added to said crude material so as to have present at the commencement of the said heating thereof between about ½% and 10% of a water-soluble salt of a strong base and an oxygenated sulfur acid selected from the group consisting of hydrazine sulfate and the alkali metal sulfites, acid sulfites, hyposulfites, sulfates and thiosulfates.

9. The process of claim 8 wherein the water-soluble salt is used in amounts between about 1% and 5%.

JAMES J. O'BRIEN.

REFERENCES CITED

The following references are of record in the file of this patent:

UNITED STATES PATENTS

| Number | Name | Date |
|---|---|---|
| 2,148,194 | Drucker | Feb. 21, 1939 |
| 2,220,116 | O'Brien | Nov. 5, 1940 |
| 2,351,985 | Loeffler | June 20, 1944 |

OTHER REFERENCES

Loeffler, APC, Serial No. 350,065, May 11, 1943.